(12) United States Patent
Layec et al.

(10) Patent No.: US 11,655,586 B2
(45) Date of Patent: May 23, 2023

(54) CABLE FOR A TIRE

(71) Applicant: COMPAGNIE GENERALE DES ETABLISSEMENTS MICHELIN, Clermont-Ferrand (FR)

(72) Inventors: Fanny Layec, Riom (FR); Rèmi Pinaut, Clermont-Ferrand (FR); Marie Chassagne, Cebazat (FR); Laurent Bucher, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 380 days.

(21) Appl. No.: 16/760,629

(22) PCT Filed: Oct. 31, 2017

(86) PCT No.: PCT/IB2017/056758
§ 371 (c)(1),
(2) Date: Apr. 30, 2020

(87) PCT Pub. No.: WO2019/086929
PCT Pub. Date: May 9, 2019

(65) Prior Publication Data
US 2020/0347547 A1    Nov. 5, 2020

(51) Int. Cl.
*D07B 1/06* (2006.01)
*B60C 9/00* (2006.01)
*B60C 9/20* (2006.01)

(52) U.S. Cl.
CPC .......... *D07B 1/0613* (2013.01); *B60C 9/0007* (2013.01); *B60C 2009/2077* (2013.01);
(Continued)

(58) Field of Classification Search
CPC .......................... D07B 1/0613; B60C 9/0007
See application file for complete search history.

(56) References Cited

U.S. PATENT DOCUMENTS

2011/0225944 A1*  9/2011  Mullebrouck ....... D07B 1/0613
                                                                 57/220
2012/0267025 A1* 10/2012  Daghini ................ B60C 9/0007
                                                                 152/526
(Continued)

FOREIGN PATENT DOCUMENTS

EP        0811786 A1    12/1997
EP        2218588        8/2010
(Continued)

OTHER PUBLICATIONS

International Search Report and Written Opinion Thereof, PCT Application No. PCT/IB2017/056758, dated Oct. 31, 2017, 13 Pages.
(Continued)

*Primary Examiner* — Shaun R Hurley
(74) *Attorney, Agent, or Firm* — Dority & Manning, P.A.

(57) ABSTRACT

A cable as may be used in a tire, including a pneumatic tire. The cable is constructed in a manner that can provide a desired stiffness to a tire as well as a certain amount of structural elongation. The cable can be provided in a manner that does not necessarily result in an increase in the overall weight of the tire as would occur by e.g., increasing the diameter of a conventional cable construction.

13 Claims, 5 Drawing Sheets

(52) U.S. Cl.
CPC ............... *B60C 2009/2096* (2013.01); *D07B 2201/1044* (2013.01); *D07B 2201/2006* (2013.01); *D07B 2201/2025* (2013.01); *D07B 2401/201* (2013.01); *D07B 2401/208* (2013.01)

(56) References Cited

U.S. PATENT DOCUMENTS

2013/0261223 A1* 10/2013 Cheng .................... D07B 7/025
                                                              523/222
2017/0114497 A1*  4/2017 Liu ......................... D07B 1/10

FOREIGN PATENT DOCUMENTS

| JP | S62282087 A | 12/1987 |
| JP | H09226318 | 9/1997 |
| JP | H1161666 | 3/1999 |
| JP | 2001020188 A * | 1/2001 | ........... D07B 1/0613 |
| JP | 2006/502316 A | 1/2006 |
| JP | 2009248751 | 10/2009 |
| WO | WO-2005001194 A1 * | 1/2005 | ........... D07B 1/0613 |
| WO | WO2011070542 | 6/2011 |

OTHER PUBLICATIONS

Anonymous: "High tensile strength steel cord constructions for tyres", Research Disclosure, Kenneth Mason Publications, Hampshire, UK, GB, vol. 340, No. 54,Aug. 1, 1992 (Aug. 1, 1992), XP007118007,ISSN: 0374-4353,p. 11-p. 13 p. 8, paragraph 1.

European Office Action Corresponding Application No. 17797758 dated Mar. 22, 2021.

Machine Translated Japanese Office Action Corresponding to Application No. 2020524409 dated Jun. 16, 2021.

* cited by examiner

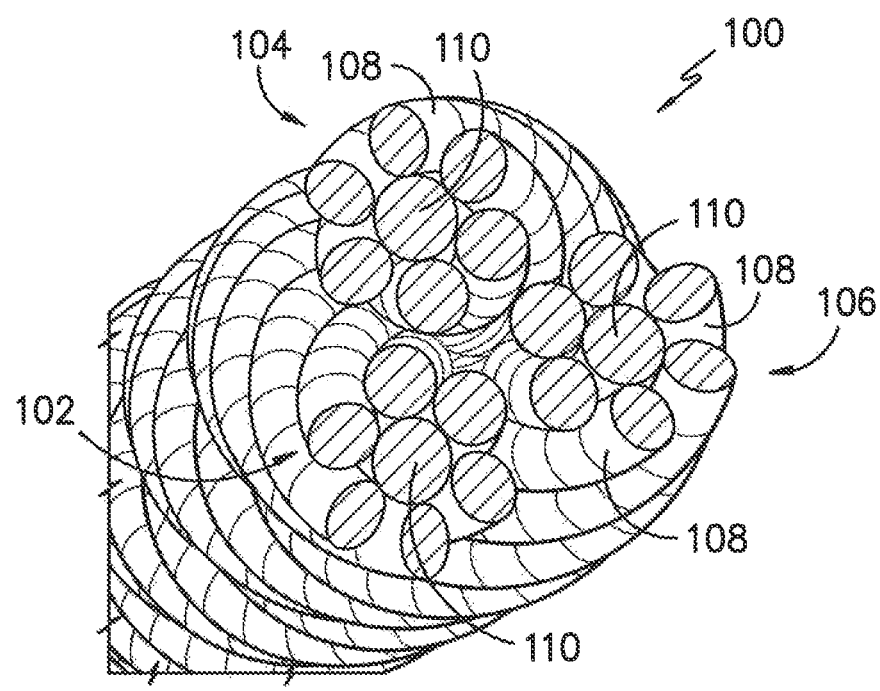
FIG. -1-
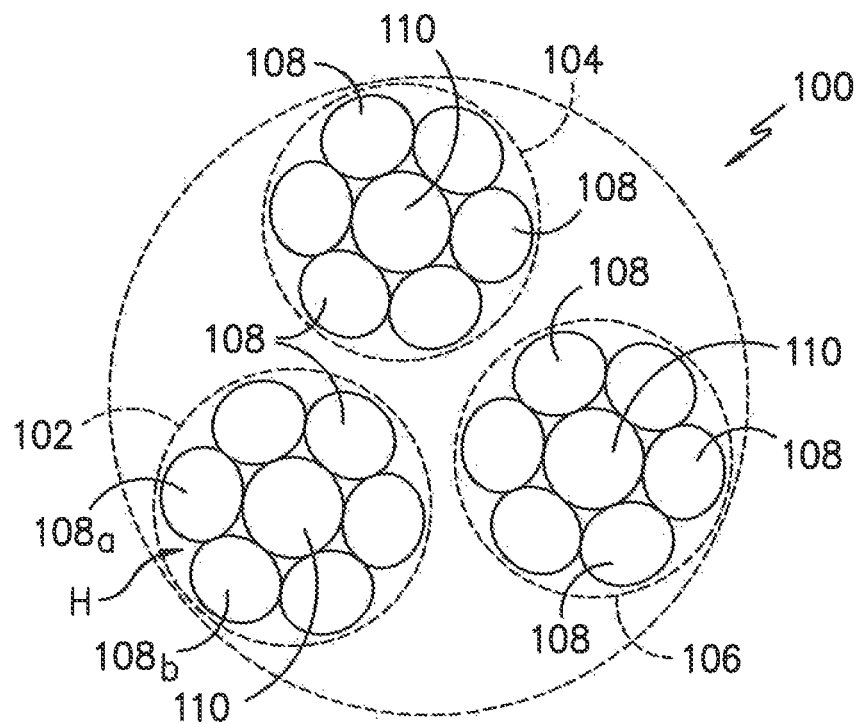
FIG. -2-

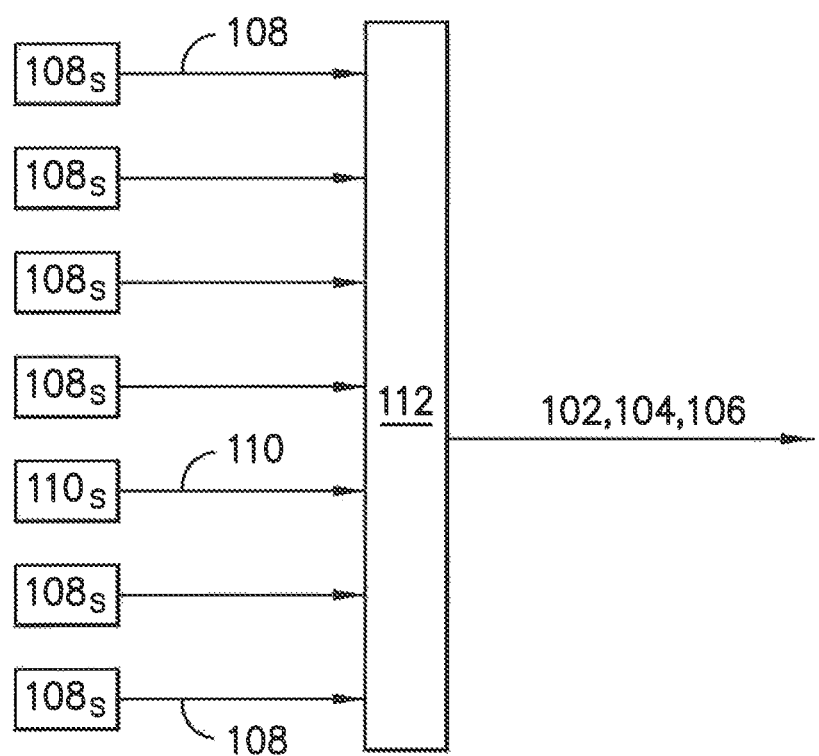
FIG. -3-

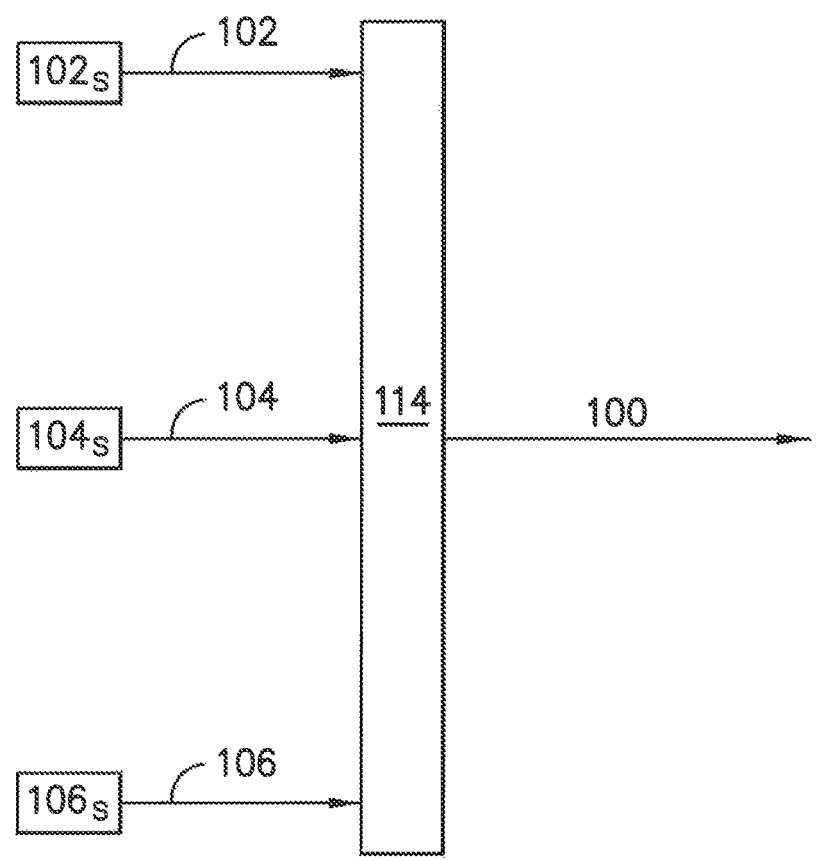
FIG. -4-

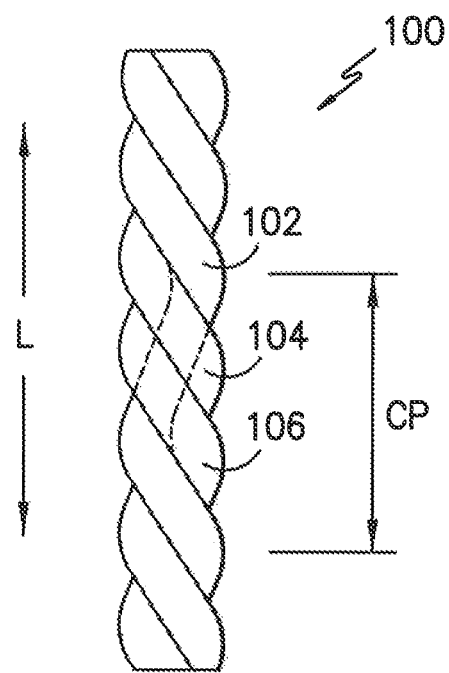
FIG. -5-
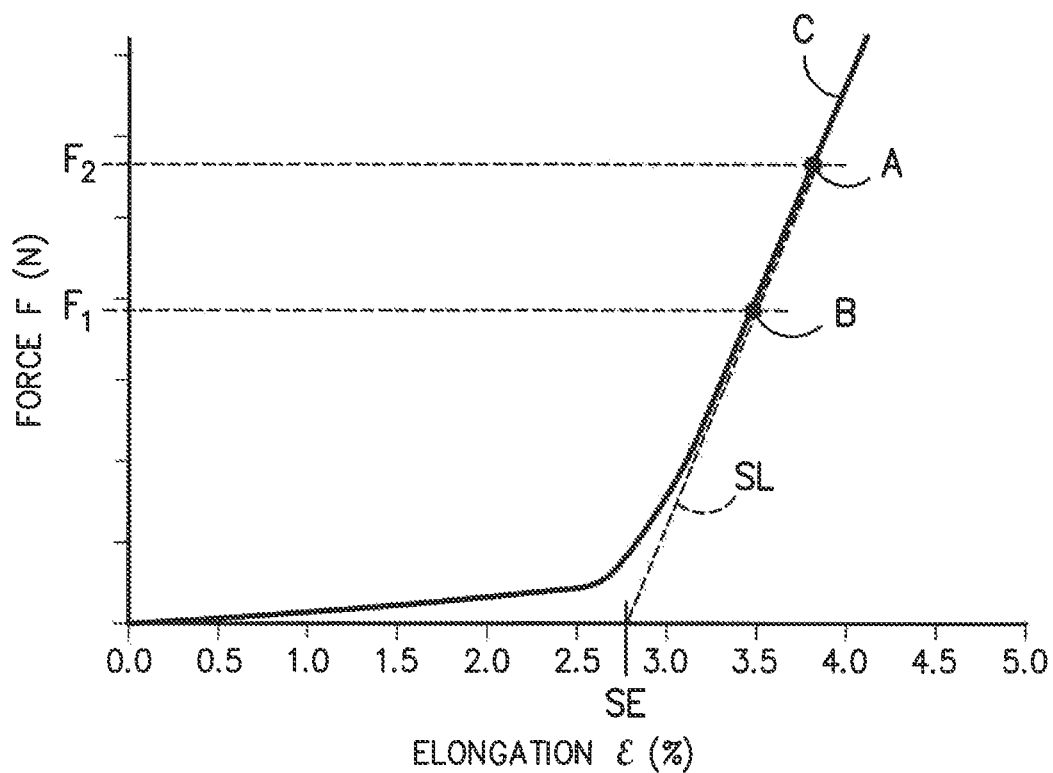
FIG. -6-

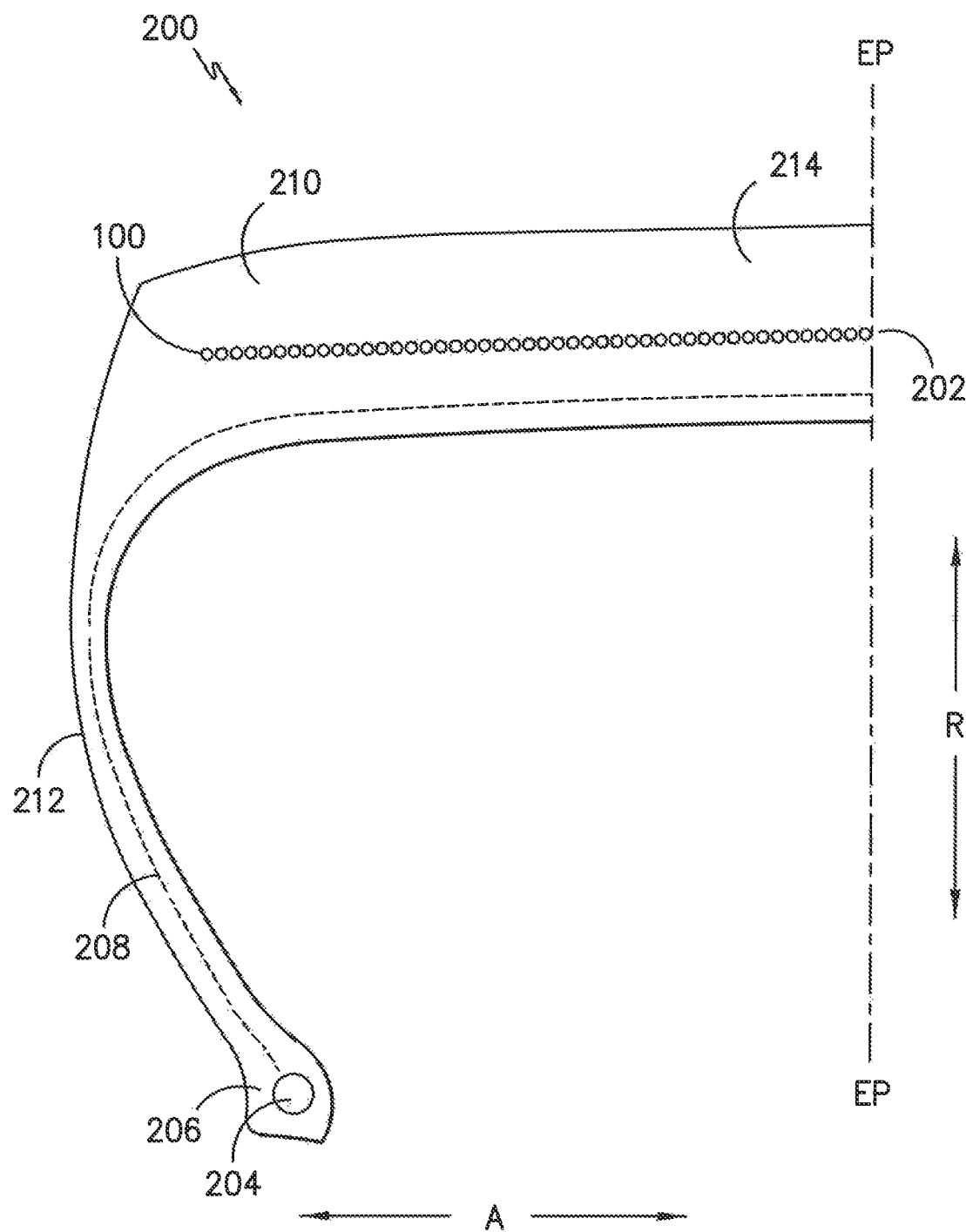
FIG. -7-

# CABLE FOR A TIRE

CROSS-REFERENCE TO RELATED APPLICATIONS

The present application is a § 371 Application of PCT/IB2017/056758 filed on Oct. 31, 2017, all of which is incorporated herein by reference for all purposes.

FIELD OF THE INVENTION

The subject matter of the present disclosure relates generally to a cable as can be used in a tire, including a pneumatic tire.

BACKGROUND OF THE INVENTION

Tires commonly incorporate various belts that can include cables providing strength and protection for use. Such belts may be placed in the crown portion and may have various widths and constructions. One or more rubber materials may form part of the belt and may surround and even penetrate small gaps between the cables.

During manufacture, an uncured or "green" tire is created by assembling various components (including the belts) into position. The uncured tire is then placed into a mold where it is subjected to substantial heat and pressure, which e.g., cures the rubber materials and may form features such as a tread pattern into the tire. A bladder or other device may be inflated to press the uncured tire against the mold.

Along with the belts, various components of the tire may be stretched, moved, or both, during this molding process. More particularly, as the tire is pressed against the mold, components in e.g., the crown portion of the tire may move relative to each other. Movement, including stretching, of such components during pressing in the mold may be required in order to properly position such relative to the mold and each other. Conversely, if such components in the crown portion lack certain stiffness, then too much movement may occur during molding-particularly among belts in the crown portion. Because curing of the rubber materials fixes the relative positions of these components, such improper positioning will likely not be remedied upon removal of the cured tire from the mold. The resulting performance of the tire may be adversely impacted.

Additionally, inflation of a pneumatic tire typically causes the tire to change shape as a gas e.g., air is provided under pressure into the cavity of the tire mounted onto a wheel. Mechanical properties such as stiffness of one or more cables used in the belts may control the resulting shape of the inflated tire. The shape of the inflated tire can also affect the performance properties of the tire.

The stiffness of a cable as may be used in the belt of a tire can be increased by e.g., using cables having a larger diameter. However, the larger diameter may also undesirably increase the weight of the tire. Furthermore, if the cable is too stiff, then the uncured tire may resist being pressed into the proper position within the mold as previously mentioned.

Document WO2015/014639 identifies problems including rubber penetration in steel cords and suggests a need for a steel cord having more than 3 percent structural elongation. Document WO2015/014639 proposes a cable for a tire having a cable pitch of 8 mm and a pitch ratio (defined herein at Equation 1) of 1.8.

Document WO2012/017399 reports that using smaller filaments for tire reinforcement can compromise the stress resistance of the tire. Document WO2012/017399 proposes a cable for a tire having a cable pitch of 6 mm and a pitch ratio of 2.

Accordingly, there is a need for a cable that can address one or more of the above and other problems. Such a cable that can be provided without necessarily increasing the weight of the tire or that can even be provided at less weight than conventional cables would be particularly useful.

SUMMARY OF THE INVENTION

The present invention provides a cable as may be used in a tire, including a pneumatic tire. The cable is constructed in a manner that can provide a desired stiffness to a tire as well as a certain amount of structural elongation. The cable can be provided in a manner that does not necessarily result in an increase in the overall weight of the tire as would occur by e.g., increasing the diameter of a conventional cable construction. Additional objects and advantages of the invention will be set forth in part in the following description, or may be apparent from the description, or may be learned through practice of the invention.

In one exemplary embodiment, the present invention provides a cable that may be used e.g., in a tire. The cable includes a plurality of strands twisted together at a cable pitch in the range of 5 mm to 7 mm. Each strand includes a plurality of filaments twisted together at a strand pitch in the range of 2.9 mm to 5.9 mm. A pitch ratio of the cable pitch to the strand pitch is in the range of 1.2 to 1.7.

In another exemplary embodiment, the present invention provides a tire that includes opposing bead portions and a carcass extending between the opposing bead portions and through a crown portion of the tire. The tire includes a belt having a cable forming an angle $\theta$ from an equatorial plane of the tire, wherein $\theta$ is in the range of zero to 10 degrees. The cable includes a plurality of strands twisted together at a cable pitch in the range of 5 mm to 7 mm, with each strand comprising a plurality of filaments twisted together at a strand pitch in the range of 2.9 mm to 5.9 mm. A pitch ratio of the cable pitch to the strand pitch is in the range of 1.2 to 1.7.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective end view of an exemplary embodiment of a cable of present invention where each strand is depicted schematically.

FIG. 2 is a schematic, cross-sectional end view of the exemplary cable of FIG. 1.

FIGS. 3 and 4 provide schematic illustrations of an exemplary method of manufacturing the exemplary cable of FIGS. 1 and 2.

FIG. 5 provides a schematic illustration related to determining pitch of an exemplary cable.

FIG. 6 provides a plot illustrating an exemplary method for determining structural elongation of an exemplary cable of the present invention.

FIG. 7 is a cross-sectional view of one-half of an exemplary tire of the present invention.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

FIGS. 1 and 2 provide illustrations relating to an exemplary embodiment of a cable 100 of the present invention. Cable 100 (represented schematically by dashed lines in FIG. 2) includes a plurality of strands 102, 104, and 106. Strands 102, 104, and 106 (also represented schematically by dashed lines in FIG. 2) are twisted together to form cable 100 as they wrap around each other. For the exemplary embodiment shown in FIGS. 1 and 2, cable 100 includes three strands. Other embodiments of the invention may include a different number of strands provided the resulting cable meets certain requirements as further described herein.

In one exemplary embodiment, cable 100 has an overall diameter of 1.4 mm or less. As used herein, the overall diameter of cable 100 may be determined by positioning a test sample on a profile projector and applying 0.4 kilograms of tension. The profile of the test sample of then magnified ten times onto a screen. The overall diameter is determined be measuring the width of the profile of the outer layer over a length specified according to the cable.

Each strand 102, 104, or 106 includes a plurality of outer filaments 108 and a central filament 110. More particularly, for the exemplary embodiment depicted, each strand 102, 104, and 106 includes six outer filaments 108 wrapped around a single, central filament 110. Other embodiments of the invention may include a different number of strands provided the resulting cable meets certain requirements as further described herein.

In one exemplary embodiment of the present invention, outer filaments 108 are each in contact with adjacent outer filaments along the length of a respective strand 102, 104, and 106. For example, as shown in FIG. 2, outer filaments $108_a$ and $108_b$ are adjacent to each other along the circumferential direction of strand 102 and make contact at their sides H. As such, when cable 100 is incorporated into a tire, the rubber materials used to form the tire do not saturate cable 100 by passing into small gaps or crevices between filaments 108. In another exemplary aspect, the diameter of central filament 110 is greater than the diameter of outer filaments, which can allow for better penetration of rubber during tire manufacture.

In one exemplary embodiment of the invention, central filament 110 has a central filament diameter in the range of 0.170 mm to 0.206 mm (0.170≤ central filament diameter ≤0.206 mm). In another exemplary embodiment of the invention, central filament 110 has a central filament diameter in the range of 0.194 mm to 0.206 mm (0.194≤ central filament diameter ≤0.206 mm). In still another embodiment, central filament 110 has a central filament diameter of 0.200 mm.

In one exemplary embodiment of the invention, each outer filament 108 has an outer filament diameter in the range of 0.170 mm to 0.185 mm (0.170≤ outer filament diameter ≤0.185 mm). In still another embodiment, outer filament 108 has an outer filament diameter of 0.175 mm.

FIGS. 3 and 4 schematically illustrate an exemplary process as may be used to manufacture cable 100. Referring to FIG. 3, multiple supplies $108_s$ of filaments 108 are provided to a process 12. A supply $110_s$ of filament 100 is provided to process 112 as well. Filaments 108 are wrapped or twisted around filament 110 to provide strands 102, 104, or 106. In FIG. 4, supplies $102_s$, $104_s$, and $106_s$, provide strands to 102, 104, and 106 to process 114. Filaments 102, 104, and 106 are wrapped or twisted together to provide cable 100. In one exemplary aspect of the present invention, cable 100 is constructed from steel filaments.

As used herein, "pitch" refers to the distance along the length L of a cable or strand that is used to make one complete revolution of the respective cable or strand as it is twisted or wrapped. For example, referring to FIG. 5, cable 100 is constructed from three strands 102, 104, and 106 that are twisted along length L of cable 100. CP denotes the "cable pitch" of cable 100 or the distance along length L used for one complete revolution of strand 102. The cable pitch CP could be measured using any of strands 102, 104, and 106 as each would provide the same value.

Similarly, SP or "strand pitch" of one of the strands 102, 104, 106 refers to the distance along the length of a respective strand that is used for one complete revolution of one of its outer filaments 108.

In one exemplary aspect, cable 100 has a cable pitch CP in the range of 5.0 mm to 7.0 mm. As used herein, "in the range of" includes the endpoints of the range as well as all values between such that in one exemplary aspect the cable pitch CP of cable 100 may also be represented by 5.0 mm≤ CP ≤7.0 mm. Stated alternatively, for exemplary cable 100, the strands are twisted together so that each strand 102, 104, or 106 requires a distance or cable pitch CP in the range of 5.0 mm≤ CP ≤7.0 mm to make one complete revolution along the length of cable 100. In still another exemplary embodiment, cable pitch CP of cable 100 is in the range of 5.5 mm to 7.0 mm (5.5 mm≤ CP ≤7.0 mm). In still another embodiment, cable pitch CP of cable 100 is in the range of 5.5 mm to 6.1 mm (5.5 mm≤ CP ≤6.1 mm). In still yet another exemplary embodiment, the cable pitch CP of cable 100 is 5.8 mm.

In one exemplary aspect, strands 102, 104, and 106 each have a strand pitch SP in the range of 2.9 mm to 5.9 mm (2.9 mm≤ SP ≤5.9 mm). Stated alternatively, for each strand 102, 104, and 106, outer filaments 108 require a distance or strand pitch SP in the range of 2.9 mm≤ SP ≤5.9 mm to make one complete revolution about central filament 110. In still another embodiment, strands 102, 104, and 106 each have a strand pitch SP in the range of 3.4 mm to 4.0 mm (3.4 mm≤ SP ≤4.0 mm). In yet still another exemplary embodiment, strand pitch SP for strand 102, 104, and 106 is 3.7 mm.

As used herein, "pitch ratio" refers to the ratio of cable pitch CP to strand pitch SP, which may also be expressed by equation 1:

$$\text{pitch ratio} = CP/SP \qquad (1)$$

For the exemplary embodiment of cable 100, the pitch ratio is in the range of 1.2 to 1.7. Stated alternatively, the pitch ratio for cable 100 is 1.2≤ pitch ratio ≤1.7. In another exemplary embodiment, the pitch ratio for cable 100 is in the range of 1.5 to 1.6 (1.5≤ pitch ratio ≤1.6). In still yet another exemplary embodiment, the pitch ratio is 1.57.

As will now be further described, in another exemplary aspect of the invention, cable 100 has a structural elongation SE of between 2.1 percent and 3 percent. The "structural elongation" or SE as used herein is defined with reference to FIG. 6. As shown, FIG. 6 includes a plot of tensile force F in newtons applied to cable 100 versus the elongation ε of cable 100. As provided in equation 2, elongation ε (or "strain") is the percent ratio of the change in length (ΔL) of cable 100 under force F to the length (L) of cable F before application of force F.

$$\varepsilon = (\Delta L/L)*100 \qquad (2)$$

As shown in FIG. 6, as cable 100 is placed into tension by an increasing force F, cable 100 first goes through a phase (between ε of zero and ε of about 2.5 for curve C depicted in FIG. 6) where structural elongation occurs. Then, under increasing force F, cable 100 goes through a second phase (above ε of about 2.7) where elastic deformation occurs. To determine the structural elongation SE as defined herein, a straight line SL is drawn between two points A and B along curve C. For purposes of defining structural elongation SE herein, point A along curve C is determined at an ordinate of 588 N and point B along curve C is determined at an ordinate of 392 N. The intersection with the abscissa axis of a straight line SL passing through points A and B defines the structural elongation SE of cable 100 (which is about 2.6 percent for the exemplary plot of FIG. 6).

As stated, in one exemplary aspect of the invention, cable 100 has a structural elongation SE in the range of 2.1 percent to 3 percent (2.1≤ SE ≤3). In still another exemplary aspect, cable 100 has a structural elongation SE of 2.6 percent.

FIG. 7 illustrates a cross-sectional view of one-half of an exemplary tire 200 of the present invention. Tire 200 is symmetrical about the equatorial plane EP and, therefore, bisects tire 200 into opposing halves of substantially the same construction for which FIG. 7 depicts only one of the opposing halves. Accordingly, tire 100 includes a pair of opposing bead portions 206 with bead 204 and a pair of opposing sidewall portions 212 where only one of each pair is shown in FIG. 7 as will be readily understood by one of ordinary skill in the art. Tire 200 also includes a crown portion 210 connected to each opposing sidewall portion 212 and extending therebetween. A tread layer 214 forms the radially outermost portion of crown portion 210. A carcass 208 extends between bead portions 206.

Tire 200 includes an annular belt or layer 202 constructed from cable 100 and positioned between carcass 208 and tread 214. For this exemplary embodiment, belt 202 is constructed by wrapping cable 100 in an annular manner about tire 200 with each turn of cable 100 being parallel to an adjacent turn as depicted in FIG. 7. Cable 100 can form an angle θ from the equatorial plane EP as it wraps about tire 200. For certain embodiments, angle θ is in the range of 0 to 10 degrees (0≤ θ ≤10). In other embodiments of tire 200, additional belts or layers may be included in crown portion 210.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A cable, comprising:
    a plurality of strands twisted together at a cable pitch in the range of 5 mm to 7 mm,
    each strand comprising a plurality of filaments twisted together at a strand pitch SP in the range of 2.9 mm≤ SP ≤5.9 mm, the plurality of filaments of each strand comprising
        a single, central filament having a central filament diameter, and
        a plurality of outer filaments wrapped around the central filament, each outer filament having an outer filament diameter, wherein the central filament diameter is greater than the outer filament diameter of each outer filament, and wherein adjacent outer filaments are in contact with each other along the length of the cable;
    wherein a pitch ratio of the cable pitch CP to the strand pitch SP is in the range of 1.2≤ pitch ratio ≤1.7,
    wherein the cable has a structural elongation of between 2.1 percent and 3 percent.

2. The cable of claim 1, wherein the plurality of filaments of each strand comprises:
    six outer filaments wrapped around the central filament, each outer filament having an outer filament diameter, wherein the central filament diameter is greater than the outer filament diameter.

3. The cable of claim 2, wherein the central filament has a central filament diameter in the range of 0.194 mm to 0.206 mm.

4. The cable of claim 3, wherein the six outer filaments each have a diameter in the range of 0.170 mm to 0.185 mm.

5. The cable of claim 1, wherein the plurality of strands comprises three strands.

6. The cable of claim 1, wherein the overall diameter of the cable is 1.4 mm or less.

7. The cable of claim 1, wherein the overall diameter of the cable is 1.29 mm.

8. The cable of claim 1, wherein the filaments comprise steel.

9. The cable of claim 1, wherein the cable pitch CP is in the range of 5.5 mm≤ CP ≤6.1 mm.

10. The cable of claim 1, wherein the strand pitch SP is in the range of 3.4 mm≤ SP ≤4.0 mm.

11. The cable of claim 1, wherein the pitch ratio of the cable pitch to the strand pitch is in the range of 1.5≤ pitch ratio ≤1.6.

12. The cable of claim 1, wherein the cable has a structural elongation of 2.6 percent.

13. A tire, comprising:
    opposing bead portions;
    a carcass extending between the opposing bead portions and through a crown portion of the tire;
    a belt comprising a cable forming an angle θ from an equatorial plane of the tire, wherein θ is in the range of zero to 10 degrees, the cable comprising
        a plurality of strands twisted together at a cable pitch in the range of 5 mm to 7 mm,
        each strand comprising a plurality of filaments twisted together at a strand pitch in the range of 2.9 mm to 5.9 mm, wherein a pitch ratio of the cable pitch to the strand pitch is in the range of 1.2 to 1.7, and wherein the cable has a structural elongation of between 2.1 percent and 3 percent.

* * * * *